(12) United States Patent
Clodic

(10) Patent No.: US 6,427,394 B1
(45) Date of Patent: Aug. 6, 2002

(54) GLAZING WITH VARIABLE ABSORBING POWER

(75) Inventor: Denis Clodic, Rennes (FR)

(73) Assignee: Armines, Paris Cedex (FR)

( * ) Notice: Subject to any disclaimer, the term of this patent is extended or adjusted under 35 U.S.C. 154(b) by 0 days.

(21) Appl. No.: 09/763,816

(22) PCT Filed: Aug. 31, 1999

(86) PCT No.: PCT/FR99/02074

§ 371 (c)(1),
(2), (4) Date: Apr. 16, 2001

(87) PCT Pub. No.: WO00/12857

PCT Pub. Date: Mar. 9, 2000

(30) Foreign Application Priority Data

Aug. 31, 1998 (FR) ............................................. 98 11048

(51) Int. Cl.⁷ .................................................. E06B 7/00
(52) U.S. Cl. ...................................... 52/171.3; 52/171.2
(58) Field of Search .............................. 52/171.2, 172, 52/173.1, 786.11, 786.12, 786.13, 788.1, 171.3

(56) References Cited

U.S. PATENT DOCUMENTS

| | | | | |
|---|---|---|---|---|
| 2,386,339 A | * | 10/1945 | O'Connor | |
| 4,674,243 A | * | 6/1987 | Schoofs | |
| 4,928,448 A | * | 5/1990 | Phillip | |
| 5,027,574 A | * | 7/1991 | Phillip | |
| 5,787,652 A | * | 8/1998 | Tai | |
| 5,878,538 A | * | 3/1999 | Rossini | |
| 6,216,417 B1 | * | 4/2001 | Morin | |

FOREIGN PATENT DOCUMENTS

| | | | |
|---|---|---|---|
| DE | 31 42 695 | | 5/1983 |
| EP | 639 450 | | 2/1995 |
| FR | 2 667 349 | | 4/1992 |
| GB | 1227 417 | | 4/1971 |
| GB | 1227417 | * | 4/1971 |

* cited by examiner

Primary Examiner—Carl D. Friedman
Assistant Examiner—Kevin McDermott
(74) Attorney, Agent, or Firm—Merchant & Gould PC

(57) ABSTRACT

The invention concerns glazing sheets with variable absorbing power. The glazing comprises two transparent walls providing an inter-wall space containing one of the two following fluids: either a first transparent fluid, such as air; or a second transparent fluid, absorbing solar energy over a very large part of the spectrum, in particular liquid water or liquid water with added alcohol. The glazing further compromises a circuit for discharging energy in the form of a bead, located at its periphery, preferably consisting of a heat pip-exchanger. The glazing also comprises an apparatus for filling up or emptying the inter-wall space, as well as flexible elements for absorbing the second fluid expansion depending on temperature. The glazing can in particular be used for producing car windows.

25 Claims, 2 Drawing Sheets

GLAZING WITH VARIABLE ABSORBING POWER

Figure 1:
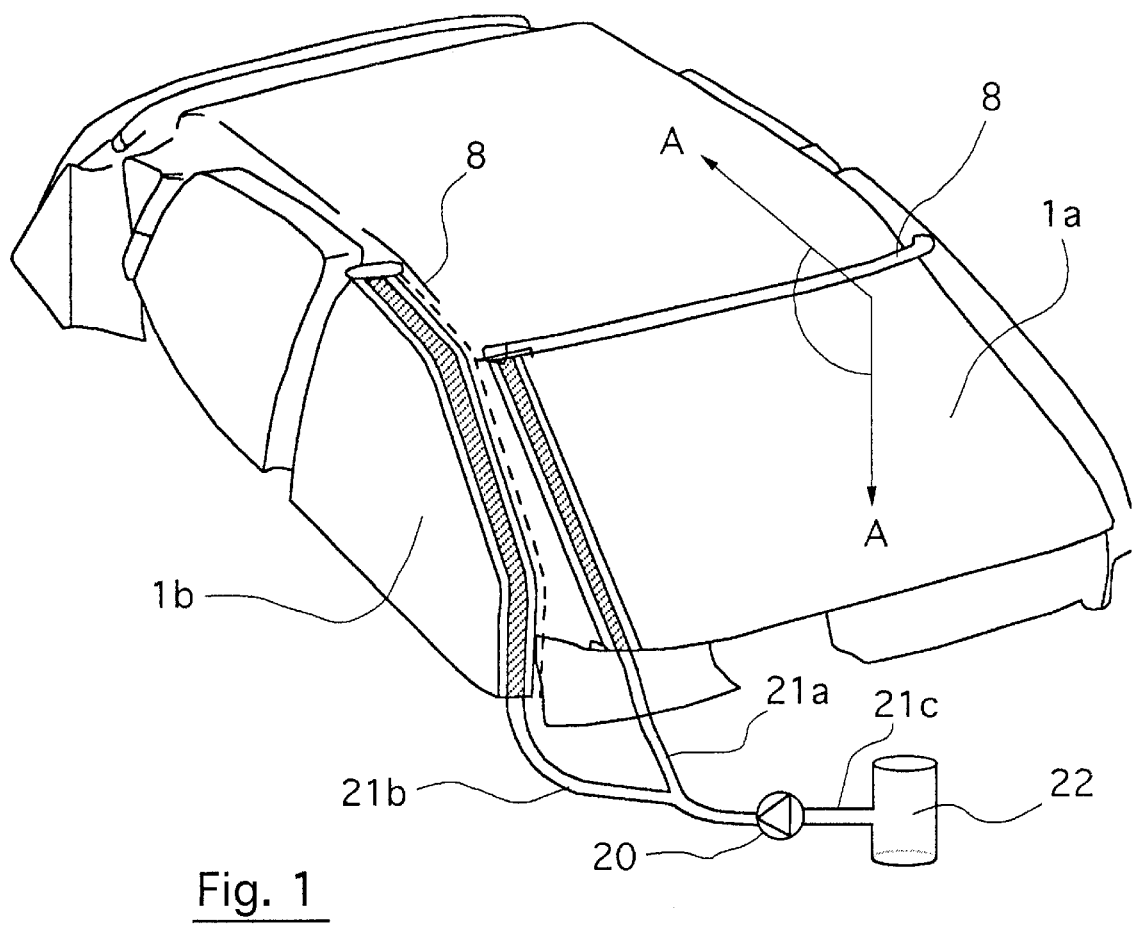

The present invention relates to glazings.

Enclosures closed by transparent glazings receive strong solar loads, especially in summer. This is notably the case for the passenger compartment of a vehicle, and also for horticultural greenhouses and house walls exposed to the South or East-West. The temperature inside the enclosure increases and becomes too high for the objects or the plants which are placed therein or for persons who are in there or who are induced to penetrate therein.

It is known that this drawback is partly overcome by staining the glass glazing so that a fraction of the solar load is reflected, without however affecting the transparence and the passengers' visibility to the outside of the vehicle. Windows with double glazing are also known wherein the internal space thereof is filled with gas having a low thermal conductivity at a relatively low pressure. It is thus possible to substantially reduce heat transfer by convection. U.S. Pat. No. 4,928,448 describes such a device. However, thermal isolation obtained in this way does not provide an obstacle to the solar load transferred through radiation.

Double glazing windows are also known. Depending on insolation, either an insulating liquid is introduced between the walls or the liquid is emptied from the inter-wall space which contains it. U.S. Pat. No. 5,787,652 describes such a vehicle window. The radiated heat is absorbed by the insulating liquid which transfers it to the inside of the vehicle by conduction and by convection.

The object of the present invention is to solve the posed problem by limiting the effects of radiated solar loads, notably in the case of a stopped vehicle when air-conditioning is no longer running. The present invention also aims at finding a remedy for the posed problem without affecting the glazing's transparence.

The glazing according to the invention has variable absorptivity. It comprises two transparent, notably glass walls. Other transparent materials other than glass may also be contemplated, notably synthetic plastics. These two walls provide an inter-wall space. Depending on the individual case, the latter contains either a first transparent fluid, notably a gas such as air, transferring solar energy in the transparence wavelength bands of said walls, or a second fluid transparent in the visible portion of the electromagnetic spectrum, absorbing solar energy on a very wide portion of the electromagnetic spectrum, notably water in the liquid state or water in the liquid state with alcohol added.

In the first case, the glazing's transparence in the visible portion of the electromagnetic spectrum is not affected and the glazing transfers the major portion of the solar load which it receives.

In the second case, the glazing absorbs the major portion of the solar energy which it receives, while remaining transparent in the visible portion of the electromagnetic spectrum. Indeed, water in the liquid state has the property of transparence, notably when it is in a thin layer under thicknesses from 1 to 2 millimeters. On the other hand, water in the liquid state has properties close to those of a black body absorbing solar radiations. Water in the liquid state as a thin layer does not provide an obstacle to transparence and furthermore, the small thickness of inter-wall space blocks convective motions. Hence, in this second case, the glazing is a radiation shield.

According to another essential characteristic feature of the invention, the glazing comprises a circuit for discharging energy located at its periphery. Preferably, the circuit for discharging energy located at the periphery of the glazing is a bead-shaped exchanger, with a heat pipe effect. Also advantageously, the second fluid absorbing solar energy is under its vapor pressure. It vaporizes and condenses in the free space within the bead. Heat energy absorbed by said second insulating fluid (in the sense of the present description, the expression "insulating fluid" refers to an absorbing fluid or liquid) is thus dissipated at the periphery of the glazing towards the outside. The exchange surface is calculated in order to discharge heat towards the outside, by convection and conduction.

In the configuration of the second case, when the interwall space is filled with the insulating liquid, the glazing is thus well adapted for a stopped vehicle receiving a high solar load. Although the air conditioning is no longer running as the engine is stopped, the temperature inside the vehicle remains moderate. The passenger which now climbs into his vehicle no longer has to wait for the air-conditioning to be running again at its standard rating in order to feel the well-being of a moderate temperature.

Nevertheless, the driver may consider that the shield of water in the liquid state affects his/her visibility and may prefer to drive his vehicle while benefiting from maximum visibility, that obtained in the situation where the fluid filling the inter-wall space is air, or where the second fluid is under its vapor pressure. The effect of the solar load is then compensated by the air-conditioning which has been able to start after starting the engine.

Preferably, according to a complementary feature of the present invention, the glazing further includes means for filling or emptying the inter-wall space in order to fill said space with said second fluid which absorbs solar energy or, according to the case, to empty said space of said second fluid and to substitute said first fluid for it.

Also preferably, the glazing according to the invention is such that the periphery of the glazing includes an expansion volume for absorbing expansions of the second fluid depending on the temperature. This expansion volume may notably be achieved by means of free volume inside the bead located at the upper portion of the glazing.

Advantageously, the thickness of the inter-wall space is larger than or equal to 1 millimeter and less than or equal to 2 millimeters. Such a thickness is sufficiently large so that water in the liquid state may act, with the properties of a back body, it is sufficiently small for blocking convective motions.

The glazing according the present invention may be applied to the thermal preconditioning of the passenger compartment of a vehicle, to the creation of a window in dwelling premises, to the creation of greenhouses.

Figure 2:
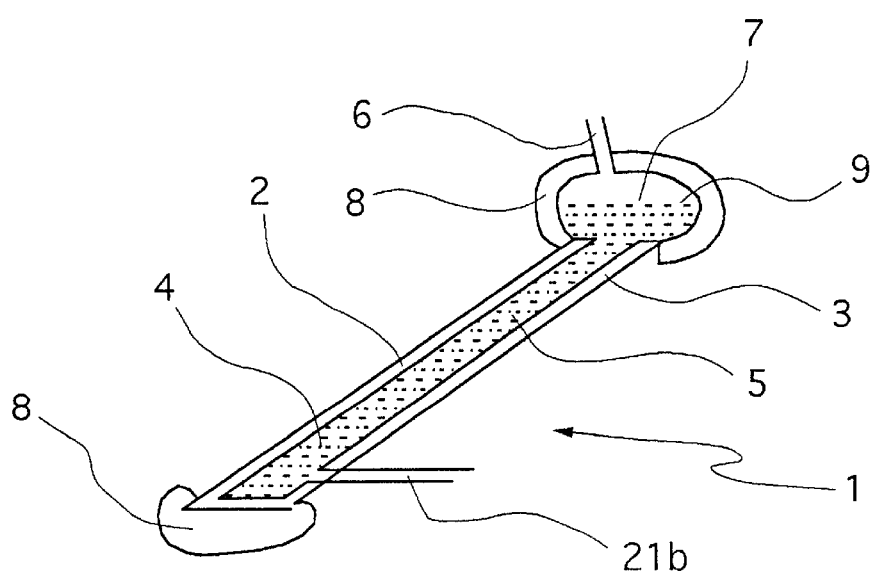
Figure 3:
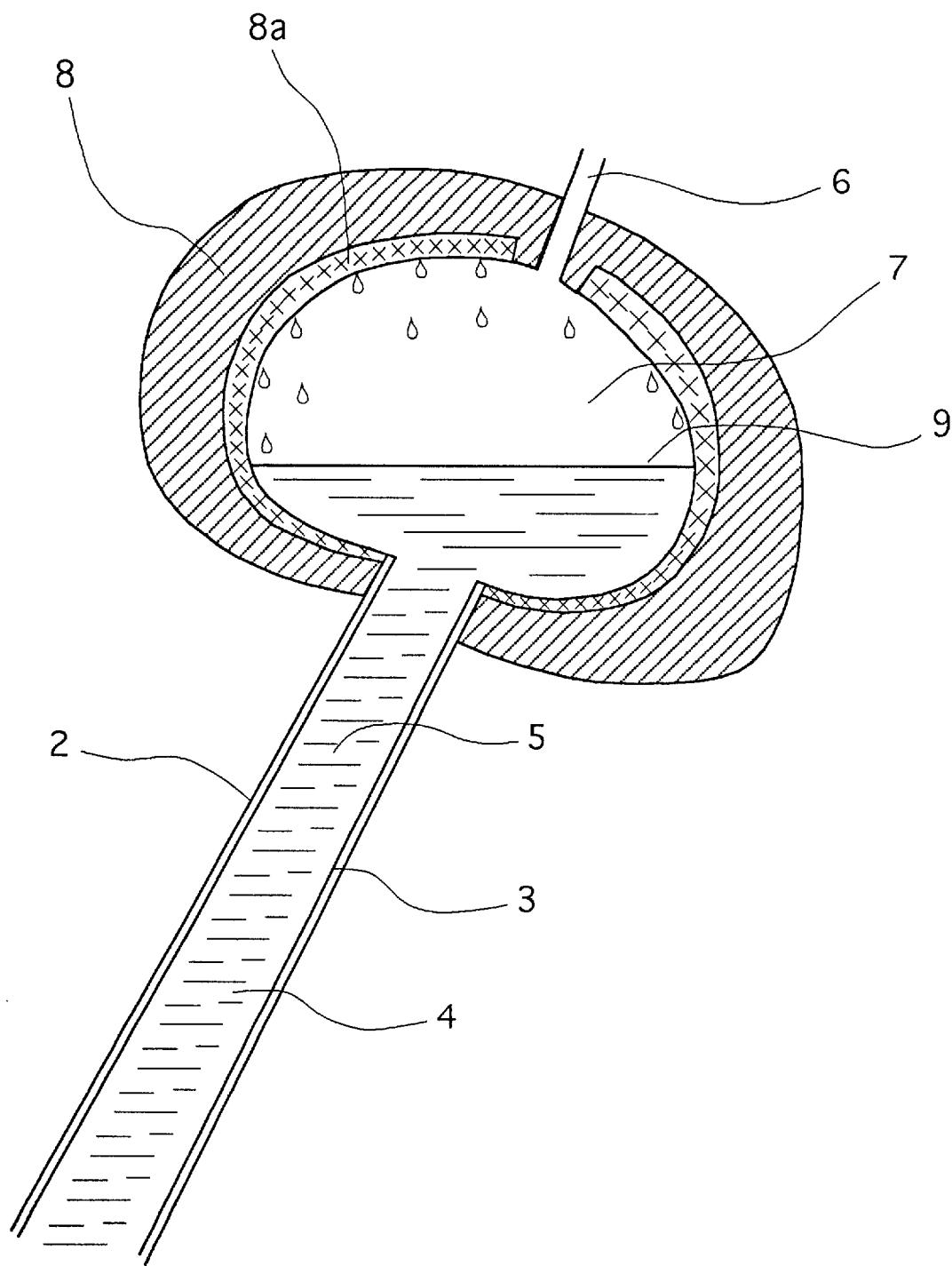

Other characteristics and advantages of the invention will become apparent upon reading the description of alternative embodiments of the invention, given as an indicative and non-limiting example, and of:

FIG. 1 which shows the overall diagram of the framework of a motor vehicle equipped with double wall and water sheet glazing, FIG. 1 also shows an alternative embodiment of a filling and emptying system for the inter-wall space, FIG. 2 which shows an enlarged sectional view of the front glazing of the vehicle along a vertical plane A—A, when the heat energy absorbing liquid is in presence of air, FIG. 3 which shows an enlarged sectional view of the front glazing of the vehicle along a vertical plane A—A, when the heat energy absorbing liquid is under its vapor pressure.

FIGS. 1, 2 and 3 will now be described.

The glazing 1 according to the invention has variable absorptivity. It comprises two transparent glass walls 2, 3. Both these walls provide an inter-wall space 4 with a thickness from 1 to 2 millimeters. Depending on the individual case, the latter contains, either a first transparent fluid, notably a gas such as air, transferring solar energy in the transparence wavelength bands for said walls, or a second fluid 5 transparent in the visible portion of the electromagnetic spectrum, absorbing solar energy on a very wide portion of the spectrum, notably water in the liquid state or water in the liquid state with added alcohol.

In the case illustrated in FIG. 2, the second fluid 5 is water in the presence of air, in this case the first fluid is air. In the case illustrated in FIG. 3, the second fluid 5 is water under its vapor pressure, in this case the first fluid 5 is steam under a low (absolute) pressure, typically 0.04 bar at 30° C. (which corresponds to the saturation vapor pressure or water vapor pressure).

When the inter-wall space 4 is filled with air or steam under its vapor pressure, the transparence of the glazing is not affected and the glazing transfers the major portion of the solar load which it receives.

When the inter-wall space 4 is filled with water, the glazing absorbs the major portion of the solar energy which it receives, while remaining transparent in the visible portion of the electromagnetic spectrum. Glazing 1 is a radiation shield in this configuration. Indeed, water in the liquid state has the property of transparence when it is in a thin layer under thicknesses of 2 millimeters. On the other hand, water in the liquid state has the properties of a quasi black body absorbing certain solar radiations, so to speak. Water in the liquid state as a thin layer does not provide an obstacle to transparence in the visible portion of the electromagnetic spectrum and furthermore, the small thickness of the inter-wall space blocks convective motions.

Although air-conditioning is no longer running when the engine is stopped, the temperature inside the vehicle remains moderate. The passenger who now climbs into his vehicle no longer has to wait for the air-conditioning to be running again at its standard rating in order to feel the well-being of a moderate temperature.

In certain cases, the driver may consider that the shield of water filling the inter-wall space 4 affects his visibility. Now, he prefers driving his vehicle while benefiting from maximum visibility. For this purpose, he will substitute air for the fluid in the liquid phase filling the inter-wall space or else he will substitute this same fluid in the vapor phase for it. To do this, the driver starts pump 20. This pump includes a set of valves which allows the flow of fluids to be reversed in the ducts 21c from pump 20 to the liquid tank 22 as well as in ducts 21a from pump 20 to the glazing and notably in ducts 21b from pump 20 to glazing 1b of the right front door. The pump sucks in the liquid which is contained in the inter-wall spaces of glazings 1a and 1b and generates sufficient depression in order to substitute a vapor phase of this same liquid for it or to enable air to enter through duct 6, after opening the valve (not shown) placed on this duct.

Conversely, on stopping the vehicle, the driver starts pump 20 by reversing the direction of the valves (this operation may be automatically controlled by turning the ignition key). The pump sucks in the liquid contained in tank 22 and injects it, through ducts 21a and 21b, into the inter-wall space of glazings 1a and 1b.

When the heat energy absorbing liquid 5 is discharged, the effect of the solar load is compensated by the air conditioning which has been able to start after starting the engine.

Glazing 1 includes at its upper periphery, a mechanical bead 8 enabling the glazing to be mounted on the framework of the vehicle. Inside this bead 8, a free expansion volume 7 is provided. Thus, the liquid 5 may freely expand depending on the temperature.

The glazing also includes at its periphery, a circuit for discharging heat energy absorbed by liquid 5. This energy discharge circuit is provided in the mechanical bead 8.

The energy discharge circuit will now be described with reference to FIG. 3, notably when liquid 5 is under its vapor pressure. In this figure, the main components of the glazings as described earlier are recognized, particularly walls 2 and 3, the inter-wall space 4 containing liquid 5, the mechanical bead 8 at the periphery of the glazing.

Liquid 5 is introduced into the inter-wall space 4 at its vapor pressure. The vapor phase is located above the filling level 9 in the free volume 7 of the mechanical bead 8. After filling, duct 6 between free volume 7 and tank 22 is closed by a valve. Pump 20 is an air pump. Discharge of the heat absorbed by liquid 5 occurs by evaporation at the liquid-vapor interface 9.

In the alternative illustrated in FIG. 3, the energy discharge circuit comprises an exchanger 8a with a heat pipe effect located in the thickness of the upper mechanical bead 8 of the glazing. It may also comprise a flexible exchanger 8a covering the internal surface of the upper mechanical bead 8 of the glazing. Vapor contained in free space 7 will condense at the exchanger 8a with a heat pipe effect. Heat received by the exchanger 8a during condensation of the vapor phase may be discharged either towards the outside directly (in the ambient air) or towards an auxiliary heat exchanger by means of a circuit assisted by a pump.

An energy discharge circuit achieved by means of a mechanical bead 8 including fins on the outside may also be used. The exchange surface of the mechanical bead 8 is calculated in order to discharge heat into the atmosphere by conduction and convection. Heat energy absorbed by fluid 5 is thus dissipated at the periphery of the glazing towards the outside.

The energy discharge circuit will now be described with reference to FIG. 2, notably when liquid 5 is at atmospheric pressure in the presence of air. In this case, a heat pipe effect energy discharge circuit may also be used in the same way as described with reference to FIG. 3. Heat absorbed by liquid 5 is transferred through simple convection to the heat pipe effect exchanger 8a. A mechanical bead including fins on the outside may also be used. Heat energy absorbed by fluid 5 is thus dissipated at the periphery of the glazing towards the outside. However, thermal exchange is less efficient than in the case when the absorbing liquid 5 is under its vapor pressure. The temperature of liquid 5 will then be in this case significantly higher.

During the emptying phase for the absorbing liquid, air will be substituted for liquid sucked in by the pump 20, by its penetration through duct 6, in the same way as described above.

The configuration which applies a liquid, notably water under its vapor pressure or in presence of air in the inter-wall space of a double-walled glazing, transferring the absorbed heat to an energy discharge circuit located at the periphery of the glazing, notably made as a heat pipe effect exchanger, may be interesting per se. In certain alternative embodiments, it is not absolutely necessary to substitute gas or a vapor for the liquid filling the space in order to improve visibility.

What is claimed is:

1. A glazing with variable absorprivity comprising:

two transparent walls spaced apart from each other to provide an inter-wall space, the inter-wall space containing one of the two following fluids:

a first transparent fluid transferring solar energy in the transparence wavelength bands of said walls, or a second fluid transparent in the visible portion of the electromagnetic spectrum which absorbs solar energy on a wide portion of the spectrum; and an energy discharge circuit located at the periphery of the glazing.

2. The glazing according to claim 1 wherein the second fluid is at its vapor pressure.

3. The glazing according to claim 1, wherein the energy discharge circuit located at the periphery of the glazing is a bead-shaped exchanger.

4. The glazing according to claim 1, further comprising:

means for filling or emptying the inter-wall space in order to fill said space with said second fluid absorbing solar energy or to empty said space of said second fluid and to substitute said first fluid for said second fluid.

5. The glazing according to claim 1, wherein the periphery of the glazing includes an expansion volume for absorbing expansions of the second fluid according to the temperature.

6. The glazing according to claim 1, wherein the thickness of the inter-wall space is larger than or equal to 1 millimeter and less than or equal to 2 millimeters.

7. The glazing according to claim 1, wherein the first fluid is a gas.

8. The glazing according to claim 7, wherein the gas is air.

9. The glazing according to claim 1, wherein the second fluid comprises water in a liquid state.

10. The glazing according to claim 1, wherein the second fluid comprises water in a liquid state with alcohol added.

11. The glazing according to claim 3, wherein the bead-shaped exchanger is a heat pipe exchanger.

12. A vehicle comprising a glazing that includes two transparent walls spaced apart from each other to provide an inter-wall space, the inter-wall space containing one of the two following fluids:

a first transparent fluid transferring solar energy in the transparence wavelength bands of said walls, or a second fluid transparent in the visible portion of the electromagnetic spectrum which absorbs solar energy on a wide portion of the spectrum; and an energy discharge circuit located at the periphery of the glazing.

13. A dwelling comprising at least one window having a glazing that includes two transparent walls spaced apart from each other to provide an inter-wall space, the inter-wall space containing one of the two following fluids:

a first transparent fluid transferring solar energy in the transparence wavelength bands of said walls, or a second fluid transparent in the visible portion of the electromagnetic spectrum which absorbs solar energy on a wide portion of the spectrum; and an energy discharge circuit located at the periphery of the glazing.

14. A greenhouse comprising a glazing that includes two transparent walls spaced from each other to provide an inter-wall space, the inter-wall space containing one of the two following fluids:

a first transparent fluid transferring solar energy in the transparence wavelength bands of said walls, or a second fluid transparent in the visible portion of the electromagnetic spectrum which absorbs solar energy on a wide portion of the spectrum; and an energy discharge circuit located at the periphery of the glazing.

15. A glazing comprising:

two transparent walls spaced apart from each other to provide an inter-wall space, said inter-wall space containing a fluid; and an energy discharge circuit located at the periphery of the glazing.

16. The glazing according to claim 15, wherein the fluid comprises water in a liquid state.

17. The glazing according to claim 15, wherein the fluid comprises water in a liquid state with alcohol added.

18. The glazing according to claim 15, wherein the fluid is at its vapor pressure.

19. The glazing according to claim 15, wherein the energy discharge circuit comprises comprises a bead-shaped exchanger.

20. The glazing according to claim 19, wherein the bead-shaped exchanger is a heat pipe exchanger.

21. The glazing according to claim 15, wherein the periphery of the glazing includes an expansion volume for absorbing expansions of the fluid according to the temperature.

22. The glazing according to claim 15, wherein the thickness of the inter-wall space is larger than or equal to 1 millimeter and less than or equal to 2 millimeters.

23. A vehicle comprising a glazing that includes two transparent walls spaced from each other to provide an inter-wall space, said inter-wall space containing a fluid; and an energy discharge circuit located at the periphery of the glazing.

24. A dwelling comprising at least one window having a glazing that includes two transparent walls spaced from each other to provide an inter-wall space, said inter-wall space containing a fluid; and an energy discharge circuit located at the periphery of the glazing.

25. A greenhouse comprising a glazing that includes two transparent walls spaced from each other to provide an inter-wall space, said inter-wall space containing a fluid; and an energy discharge circuit located at the periphery of the glazing.

* * * * *